(12) United States Patent
Soon

(10) Patent No.: US 12,374,676 B2
(45) Date of Patent: Jul. 29, 2025

(54) NEGATIVE ELECTRODE FOR SECONDARY BATTERY, METHOD FOR MANUFACTURING THE SAME, AND LITHIUM METAL SECONDARY BATTERY COMPRISING THE SAME

(71) Applicant: LG ENERGY SOLUTION, LTD., Seoul (KR)

(72) Inventor: Jiyong Soon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 626 days.

(21) Appl. No.: 17/639,007

(22) PCT Filed: Oct. 21, 2020

(86) PCT No.: PCT/KR2020/014368
§ 371 (c)(1),
(2) Date: Feb. 28, 2022

(87) PCT Pub. No.: WO2021/125536
PCT Pub. Date: Jun. 24, 2021

(65) Prior Publication Data
US 2022/0293897 A1 Sep. 15, 2022

(30) Foreign Application Priority Data
Dec. 20, 2019 (KR) .................. 10-2019-0172498

(51) Int. Cl.
*H01M 4/36* (2006.01)
*H01M 4/02* (2006.01)
(Continued)

(52) U.S. Cl.
CPC ......... *H01M 4/0404* (2013.01); *H01M 4/366* (2013.01); *H01M 4/382* (2013.01);
(Continued)

(58) Field of Classification Search
CPC .... H01M 4/0404; H01M 4/366; H01M 4/382; H01M 4/505; H01M 4/525; H01M 4/661;
(Continued)

(56) References Cited

U.S. PATENT DOCUMENTS 6,280,871 B1 8/2001 Tosco et al.
6,630,268 B2 10/2003 Tosco et al.
(Continued)

FOREIGN PATENT DOCUMENTS

CN 100359721 C 1/2008
CN 103703587 A 4/2014
(Continued)

OTHER PUBLICATIONS

Anothumakkool et al., "Interest of Molecular Functionalization for Electrochemical Storage", Nano Research, vol. 10, No. 12, 2017, pp. 4175-4200.
(Continued)

*Primary Examiner* — Matthew J Merkling
(74) *Attorney, Agent, or Firm* — Birch, Stewart, Kolasch & Birch, LLP

(57) ABSTRACT

A negative electrode for a secondary battery, including a negative electrode protective layer which can be formed by a simplified method and can effectively suppress the growth of acicular dendrites generated in the negative electrode of a lithium metal secondary battery. The negative electrode for the secondary battery includes a negative electrode current collector; a lithium metal film on the negative electrode current collector; and a negative electrode protective layer including a diazonium ion bonded to the lithium metal film.

7 Claims, 1 Drawing Sheet

(51) Int. Cl.
    *H01M 4/04*     (2006.01)
    *H01M 4/38*     (2006.01)
    *H01M 4/505*    (2010.01)
    *H01M 4/525*    (2010.01)
    *H01M 4/66*     (2006.01)
    *H01M 10/052*   (2010.01)
    *H01M 10/056*   (2010.01)

(52) U.S. Cl.
    CPC ........... *H01M 4/505* (2013.01); *H01M 4/525* (2013.01); *H01M 4/661* (2013.01); *H01M 10/052* (2013.01); *H01M 10/056* (2013.01); *H01M 2004/021* (2013.01); *H01M 2004/027* (2013.01); *H01M 2004/028* (2013.01)

(58) Field of Classification Search
    CPC ............. H01M 10/052; H01M 10/056; H01M 2004/021; H01M 2004/027; H01M 2004/028
    See application file for complete search history.

(56) References Cited

U.S. PATENT DOCUMENTS

| | | |
|---|---|---|
| 6,881,511 B1 | 4/2005 | Tosco et al. |
| 2001/0036570 A1 | 11/2001 | Tosco et al. |
| 2004/0058232 A1 | 3/2004 | Kim et al. |
| 2012/0295149 A1 | 11/2012 | Xie |
| 2013/0156941 A1 | 6/2013 | Xie |
| 2013/0177805 A1 | 7/2013 | Crepel et al. |
| 2013/0189574 A1 | 7/2013 | Crepel et al. |
| 2014/0141331 A1* | 5/2014 | Lee ................. C01G 53/006 429/223 |
| 2014/0173889 A1 | 6/2014 | Johnson et al. |
| 2014/0174954 A1 | 6/2014 | Johnson et al. |
| 2015/0299885 A1 | 10/2015 | Floner et al. |
| 2015/0318530 A1 | 11/2015 | Yushin et al. |
| 2016/0380314 A1 | 12/2016 | Yang et al. |
| 2017/0062829 A1 | 3/2017 | Ryu et al. |
| 2018/0102535 A1 | 4/2018 | Xie |
| 2018/0119301 A1 | 5/2018 | Kim et al. |
| 2018/0138512 A1 | 5/2018 | Bélanger et al. |
| 2019/0058185 A1 | 2/2019 | Lee et al. |
| 2020/0075842 A1 | 3/2020 | Choi et al. |
| 2022/0231283 A1 | 7/2022 | Valdivielso Pablo et al. |

FOREIGN PATENT DOCUMENTS

| | | |
|---|---|---|
| CN | 106486699 A | 3/2017 |
| CN | 107851799 A | 3/2018 |
| CN | 103222099 A | 5/2025 |
| EP | 3 109 924 A1 | 12/2016 |
| EP | 3 579 310 A2 | 12/2019 |
| EP | 3 745 505 A1 | 12/2020 |
| JP | 2013-544758 A | 12/2013 |
| JP | 2014-517473 A | 7/2014 |
| JP | 2016-511323 A | 4/2016 |
| JP | 5947300 B2 | 7/2016 |
| JP | 2018-517256 A | 6/2018 |
| JP | 6475627 B2 | 2/2019 |
| JP | 2022-537104 A | 8/2022 |
| KR | 10-2002-0059615 A | 7/2002 |
| KR | 10-2013-0119427 A | 10/2013 |
| KR | 10-2014-0033131 A | 3/2014 |
| KR | 10-2015-0097471 A | 8/2015 |
| KR | 10-2018-0014029 A | 2/2018 |
| KR | 10-2018-0020599 A | 2/2018 |
| KR | 20180036573 A * | 5/2019 |
| WO | WO 2012/035217 A1 | 3/2012 |
| WO | WO 2012/158924 A2 | 11/2012 |
| WO | WO 2016/208863 A1 | 12/2016 |
| WO | WO 2020/240308 A1 | 12/2020 |

OTHER PUBLICATIONS

Extended European Search Report for European Application No. 20902505.5, dated Mar. 15, 2023.

Zhou et al., "Enhanced performance of lithium-sulfur batteries based on single-sided chemical tailoring, and organiosiloxane grafted PP separator," RSC Advances, vol. 10, 2020, pp. 18115-18123.

Assresahegn et al., "Advances on the use of diazonium chemistry for functionalization of materials used in energy storage systems", Carbon 2015, vol. 92, pp. 362-381. Total 45 pages.

Chhin et al., "Diazonium-Based Anchoring of PEDOT on Pt/Ir Electrodes via Diazonium Chemistry", Journal of the Electrochemical Society, 2018, vol. 165, No. 12, pp. G3066-G3070.

International Search Report (PCT/ISA/210) issued in PCT/KR2020/014368 mailed on Feb. 1, 2021.

Soon et al., "Grafting Nitrophenyl Groups on Carbon Surfaces by Diazonium Chemistry to Suppress Irreversible Reactions in High-Voltage $LiNi_{0.5}Mn_{1.5}O_4$ Positive Electrodes", Journal of the Electrochemical Society, 2018, vol. 165, No. 7, pp. A1372-1376.

* cited by examiner

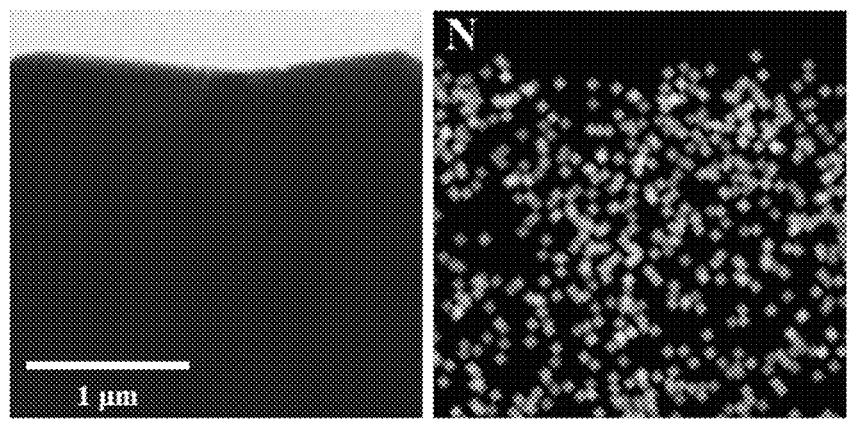

NEGATIVE ELECTRODE FOR SECONDARY BATTERY, METHOD FOR MANUFACTURING THE SAME, AND LITHIUM METAL SECONDARY BATTERY COMPRISING THE SAME

CROSS-REFERENCE TO RELATED APPLICATION(S)

This application claims the benefit of Korean Patent Application No. 10-2019-0172498 filed on Dec. 20, 2019 with the Korean Intellectual Property Office, the disclosure of which is incorporated herein by reference in its entirety.

TECHNICAL FIELD

The present disclosure relates to a negative electrode for a secondary battery, including a negative electrode protective layer which can be formed by a more simplified method and can effectively suppress the growth of acicular dendrites generated in the negative electrode of a lithium metal secondary battery, a method for manufacturing the same, and a lithium metal secondary battery comprising the same.

BACKGROUND

Lithium metal secondary battery is a battery to which a negative electrode active material made from lithium metal (Li-metal) material is applied, and has the advantage of having a theoretically very high energy density and capacity as compared with a battery to which a graphite-based or lithium alloy-based negative electrode is applied according to the prior art. Thus, research and development are ongoing to apply such a lithium metal secondary battery to a battery that requires a high energy density.

However, the lithium metal secondary battery has a problem that due to the characteristics of lithium metal, which is for a negative electrode active material, the volume change of the negative electrode is very large in a charge and discharge process, and lithium generated during charging grows into an acicular shape to form lithium dendrites. When such lithium dendrites continue to grow, they may penetrate through a separator to cause a cell short circuit, and as a result, a large problem may occur in battery performance, or a safety problem such as ignition may occur.

Meanwhile, in the case of lithium metal used as a negative electrode material in the lithium metal secondary battery, since the reactivity with the electrolyte solution is high, an irreversible reaction can be steadily generated in a charge and discharge process. The surface film produced by such irreversible reaction collapses due to a large volume change during charging and discharging, and shows a problem of causing an additional irreversible reaction. In addition, such continuous irreversible reaction may cause a problem that the coulombic efficiency of the cell is decreased, and the performance of the cell is deteriorated as a whole.

Due to such a large disadvantage resulting from the lithium metal negative electrode, in order to suppress the problems caused by continuous irreversible reactions on the surface of the lithium metal or the drawbacks caused by the growth of lithium dendrites, research and attempts have been continuously made since before to form a negative electrode protective layer by applying various materials and methods to the surface of the lithium metal negative electrode.

Previously, as a representative example, techniques of forming a negative electrode protective layer on the surface of a lithium metal negative electrode by applying an atomic layer deposition method (ALD) or a molecular layer deposition method (MLD) have been mainly researched and applied. In the case of the atomic layer deposition method and the molecular layer deposition method, etc., there is an advantage in that a nanoscale thin negative electrode protective layer can be uniformly formed, but there is a disadvantage in that the economic efficiency of the overall process are greatly degraded, for example, formation of a high vacuum for progressing the process is necessary, and additional expensive equipment is necessary. Moreover, in the case of the atomic layer deposition method, there is a drawback that the overall process is complicated and the deposition rate is very slow, which makes it difficult to apply in the mass production process.

Due to the problems of the atomic layer deposition method and the like, attempts have been made to form the negative electrode protective layer by applying other chemical methods and materials, but no techniques have been developed that can form a uniform and thin negative electrode protective layer comparable to the atomic layer deposition method, while effectively suppressing the growth of acicular dendrites and the like.

Due to the various problems of the prior arts, there is a continuing need to develop techniques capable of forming a negative electrode protective layer that can be formed by a more simplified method and thus has high mass productivity, and can effectively suppress the growth of acicular dendrites generated in the negative electrode of the lithium metal secondary battery.

Technical Problem

The present disclosure provides a negative electrode for a secondary battery, including a negative electrode protective layer which can be formed by a more simplified method and can effectively suppress the growth of acicular dendrites, etc. generated in the negative electrode of a lithium metal secondary battery, and a method for manufacturing the same.

Further, the present disclosure provides a method for manufacturing a lithium metal secondary battery including the negative electrode for the secondary battery.

Technical Solution

Provided herein is a negative electrode for a secondary battery including:
- a negative electrode current collector;
- a lithium metal (Li-metal) thin film present on at least one surface of the negative electrode current collector; and
- a negative electrode protective layer including a diazonium ion chemically bonded to the lithium metal thin film.

Also provided herein is a method for forming a negative electrode for a secondary battery, including a step of forming a diazonium ion or a salt thereof by reacting a nitrite compound and an amine compound on a lithium metal thin film.

Further provided herein is a lithium metal secondary battery including: the negative electrode for the secondary battery, a positive electrode, and an electrolyte disposed between the negative electrode and the positive electrode.

Advantageous Effects

According to the present disclosure, a negative electrode protective layer having a nanoscale thin and uniform thickness can be effectively formed on the lithium metal by a very simplified method of forming diazonium ions and the like by reacting an amine compound and a nitrite compound in a solvent on a lithium metal thin film.

Such a negative electrode protective layer can be formed by a very simplified process as compared with the atomic layer deposition method, and can have a very uniform and thin thickness comparable to that of a protective layer formed by the atomic layer deposition method. In addition, the diazonium ion-containing negative electrode protective layer formed by such as method can effectively suppress various problems occurring on the negative electrode of the lithium metal secondary battery, for example, problems caused by continuous irreversible reactions and/or problems caused by the growth of acicular lithium dendrites, and thus can greatly contribute to improving the performance and lifetime characteristics of the lithium metal secondary batteries capable of being mass-produced.

BRIEF DESCRIPTION OF THE DRAWINGS

The FIGURE is a diagram showing the results of analyzing a negative electrode surface on which a negative electrode protective layer is formed in Example 1 by TEM (left) and EELS (right) mapping, respectively.

DETAILED DESCRIPTION OF THE EMBODIMENTS

Throughout the specification, when a part is referred to as "including" a certain component, it means that it can further include other components, without excluding the other components, unless otherwise stated. The term "about or approximately" or "substantially" used herein is intended to have meanings close to numerical values or ranges specified with an allowable error and intended to prevent accurate or absolute numerical values disclosed for understanding of the present disclosure from being illegally or unfairly used by any unconscionable third party. Further, the term "step of~" as used throughout the specification does not mean "step for~".

Throughout the specification, the term "combination(s) thereof" included in Markush type description means mixture or combination of one or more selected from a group consisting of components described in Markush type, and thereby means including one or more selected from a group consisting of the components.

Based on the definitions as described above, embodiments of the present disclosure will be described in detail. However, these embodiments are presented for illustrative purposes only, and the scope of the present disclosure is not limited thereto, and the present disclosure is only defined by the scope of the claims described hereinafter.

According to one embodiment of the present disclosure, there is provided a negative electrode for a secondary battery including: a negative electrode current collector; a lithium metal (Li-metal) thin film formed on the negative electrode current collector; and a negative electrode protective layer including a diazonium ion chemically bonded to the lithium metal thin film.

The present inventors have continued research to form a negative electrode protective layer having a thin and uniform thickness and capable of effectively suppressing various problems of a lithium metal negative electrode through a more simplified process. As a result of the continuous research, the inventors have found that as a diazonium ion-containing negative electrode protective layer is formed on the lithium metal negative electrode by applying a diazonium ion formation reaction, the above-mentioned various requirements can be satisfied, and completed the invention.

As also confirmed in Examples and the like described hereinafter, the diazonium ion-containing negative electrode protective layer included in the negative electrode of one embodiment can be formed to have a nanoscale thin and uniform thickness on a lithium metal, by a very simplified method of forming diazonium ions or the like by reacting an amine compound and a nitrite compound in a solvent on a lithium metal thin film. The negative electrode protective forms the diazonium ions and at the same time, can be formed to have a very thin and uniform thickness while the diazonium ion-containing compound being chemically bonded in the form of a graft bond to the surface of the lithium metal negative electrode.

Therefore, such a negative electrode protective layer can be formed by a process of a single reaction step, which is much simplified as compared with the atomic layer deposition method or the like, and can have a very uniform and thin thickness comparable to that of the protective layer formed by the atomic layer deposition method. In addition, it has been found that the diazonium ion-containing negative electrode protective layer formed by such a method can very effectively suppress various problems occurring on the negative electrode of the lithium metal secondary battery, for example, the problem caused by continuous irreversible reactions and/or the problem caused by the growth of acicular lithium dendrites.

Therefore, the negative electrode for the secondary battery of one embodiment has very high mass productivity as compared with the atomic layer deposition method, and can effectively suppress the growth of acicular lithium dendrites, etc., and thus can greatly contribute to the improvement of the performance and lifetime characteristics of the lithium metal secondary battery.

Hereinafter, a negative electrode for a secondary battery according to an embodiment of the present disclosure, a method for manufacturing the same, and a lithium metal secondary battery including the same will be described in more detail.

Negative Electrode for Lithium Metal Secondary Battery

As described above, the negative electrode for a secondary battery according to one embodiment includes a lithium metal thin film formed on the negative electrode current collector, and also includes a negative electrode protective layer including a diazonium ion chemically bonded to the lithium metal thin film.

In the negative electrode of one embodiment, the negative electrode protective layer may include a diazonium ion formed by reacting a predetermined organic group-bonded amine compound with a nitrite compound:

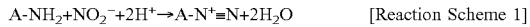
A-NH$_2$+NO$_2^-$+2H$^+$→A-N$^+$≡N+2H$_2$O　　　[Reaction Scheme 1]

Thereby, the negative electrode protective layer may be formed to include a diazonium ion of the following Chemical Formula 1, or include a salt of the diazonium ion, for example, a halogen salt of the diazonium ion:

A-N$^+$≡N　　　[Chemical Formula 1]

in Reaction Scheme 1 and Chemical Formula 1, A is a substituted or unsubstituted alkyl group having 1 to 20 carbon atoms, or a substituted or unsubstituted aryl group having 6 to 40 carbon atoms. Wherein, the alkyl group or the aryl group may be substituted or unsubstituted with an alkyl group having 1 to 20 carbon atoms, a nitro group (—NO$_2$), an alkoxy group, an amine group, a halogen, a carboxyl group (—COOH), —SO$_3$H, —SH or —CS.

In the negative electrode protective layer, the group A present in the diazonium ion may be graft bonded or the like to the surface of the lithium metal thin film by the function of the diazonium ion and the radical reaction based thereon. As a result, the negative electrode protective layer can effectively suppress problems caused by an irreversible reaction and/or the growth of acicular lithium dendrites, and problems of a short circuit associated therewith, on the lithium metal thin film serving as a negative electrode of a secondary battery.

Further, the negative electrode protective layer including diazonium ions and the like may have a thickness of 1 nm to 1 μm, or 2 to 500 nm, or 5 to 300 nm. By applying the diazonium ion formation reaction of the above-mentioned Reaction Scheme 1 or the like, the negative electrode protective layer having the above-mentioned thickness can be appropriately formed by controlling the thickness. Further, by forming the negative electrode protective layer having such thickness, it can effectively suppress the growth of acicular dendrites on the surface of the negative electrode, and also cannot impair the capacity characteristics of the negative electrode and the lithium metal secondary battery including the same.

Meanwhile, in the negative electrode of the above-described one embodiment, the copper current collector may be generally formed to have a thickness of 3 to 500 μm. Further, the lithium metal thin film formed on the copper current collector may be formed to have a thickness of 1 to 100 μm, or 2 to 50 μm, or 3 to 30 μm, depending on a typical configuration of a lithium metal secondary battery. Further, the lithium metal thin film may be formed on the copper current collector through a method widely known in the art, such as deposition, electroplating, and rolling.

According to another embodiment of the present disclosure, there is provided a method for manufacturing the negative electrode for a secondary battery according to the above-mentioned one embodiment. The method for manufacturing such negative electrode may include a step of forming a diazonium ion or a salt thereof by reading a nitrite compound and an amine compound on the lithium metal thin film.

In a more specific embodiment, the method for manufacturing the negative electrode may further include a step of reacting the diazonium ion formed through the above reaction step, a compound including the same, or a salt thereof with the lithium metal thin film. By the reaction with the lithium metal thin film, the diazonium ion, for example, the organic group A contained therein, can be chemically bonded in the form of a graft bond to the lithium metal thin film to form a negative electrode protective layer and a negative electrode of one embodiment.

However, the step of reacting the diazonium ion with the lithium metal thin film is not substantially performed separately from the step of forming the diazonium ion or a salt thereof, and can be performed spontaneously and sequentially with the reaction step for forming the diazonium ion or the like in a single solvent system In this way, since the above-mentioned diazonium ion-containing negative electrode protective layer can be formed through a single process in a substantially single solvent system, and the process of forming the negative electrode protective layer can be greatly simplified as compared with the conventional atomic layer deposition method or the like. As a result, it can be applied very easily to the mass production process of lithium metal secondary batteries.

Meanwhile, in the process of forming the above-mentioned negative electrode protective layer, the types of the amine compound, the nitrite compound and the solvent for forming the diazonium ion are not particularly limited, and any component previously known to be applicable to form a diazonium ion or a salt thereof can be used.

For example, a compound represented by the following Chemical Formula 2 may be used as the amine compound, and depending on the type of the organic group A bonded to the Chemical Formula 1, a compound in which the organic group is bonded to an amine group may be appropriately selected and used:

A-NH$_2$ [Chemical Formula 2]

in Chemical Formula 2, A is as defined in Chemical Formula 1.

Further, as the nitrite compound that reacts with the amine compound to form a diazonium ion, tert-butyl nitrite, sodium nitrite, or the like may be used. In addition to this, in order to effectively react the amine compound and the nitrite compound to form a diazonium ion, the reaction step thereof may be performed in the presence of an acid such as hydrochloric acid, if necessary.

Further, the step of forming the diazonium ion and the step of reacting with the lithium metal thin film performed in a solvent system identical thereto may be performed in an organic solvent such as acetonitrile or tetrahydrofuran. More specifically, these reaction steps may be performed, for example, by a method of reacting the amine compound and the nitrite compound in the organic solvent in a state where the lithium metal thin film formed on the negative electrode current collector is immersed in the organic solvent.

Meanwhile, the negative electrode for the secondary battery of one embodiment can be manufactured by a conventional method for forming a negative electrode of a lithium metal secondary battery, except that the negative electrode protective layer containing diazonium ions is formed by the above-mentioned method, and thus, additional descriptions thereof will be omitted.

Lithium Metal Secondary Battery

Meanwhile, according to another embodiment of the present disclosure, there is provided a lithium metal secondary battery including the negative electrode for the secondary battery according to the above-mentioned one embodiment. Such a secondary battery may include the negative electrode of the above-mentioned one embodiment, an electrolyte, and a positive electrode.

Meanwhile, the electrolyte of the lithium metal secondary battery may be a liquid electrolyte (i.e., an electrolyte solution) or a solid electrolyte.

When the electrolyte of the lithium metal secondary battery is a liquid electrolyte, it includes a non-aqueous organic solvent and a lithium salt.

The non-aqueous organic solvent serves as a medium capable of moving ions that are involved in an electrochemical reaction of a battery.

The type of the non-aqueous organic solvent is not particularly limited, and an ether-based, carbonate-based, ester-based, ketone-based, alcohol-based, or aprotic solvent may be used. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, 1,1-dimethylethylacetate, methylpropionate, ethylpropionate, γ-butyrolactone, decanolide, valerolactone, mevalonolactone, caprolactone, and the like. Examples of the ether-based solvent may include dimethyl ether, 1,2-dimethoxyethane, dibutyl ether, tetraglyme, diglyme, 2-methyltetrahydrofuran, tetrahydrofuran, and the like. Examples of the ketone-based solvent may include cyclohexanone and the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon group, which may include a double bond, an aromatic ring, or an ether bond), amides such as dimethylformamide, dioxolanes such as 1,3-dioxolane, sulfolane, and the like. Among them, an ether-based solvent or a carbonate-based solvent can be appropriately used from the viewpoint of improving the life characteristics of the lithium metal secondary battery.

Further, the non-aqueous organic solvent may be used alone or as a mixture of two or more thereof. When the solvent is used as a mixture of two or more, the mixing ratio thereof may be appropriately controlled according to the desired battery performance, which may be widely understood by those skilled in the art.

In addition, when the carbonate-based solvent is used, it is favorable to use a mixture of a cyclic carbonate and a chained carbonate. In this case, the cyclic carbonate and the chained carbonate are mixed in a volume ratio of 1:1 to 1:9, so that the performance of the electrolyte solution can be favorably exhibited.

The non-aqueous organic solvent may further include an aromatic hydrocarbon-based organic solvent in addition to the carbonate-based solvent, Wherein, the carbonate-based solvent and the aromatic hydrocarbon-based organic solvent may be mixed in a volume ratio of 1:1 to 30:1.

As the aromatic hydrocarbon-based organic solvent, an aromatic hydrocarbon-based compound of the following Chemical Formula 3 may be used,

[Chemical Formula 3]

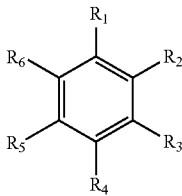

in Chemical Formula 3, $R_1$ to $R_6$ are each independently hydrogen, halogen, a $C_1$ to $C_{10}$ alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1 dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain a vinylene carbonate or an ethylene carbonate-based compound of the following Chemical Formula 2 in order to improve the lifetime of the battery:

[Chemical Formula 2]

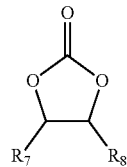

in Chemical Formula 2, $R_7$ and $R_3$ are each independently hydrogen, a halogen group, a cyano group (ON), a nitro group ($NO_2$), or a C1 to C5 fluoroalkyl group, and at least one of $R_7$ and $R_8$ is a halogen group, a cyano group (ON), a nitro group ($NO_2$), or a C1 to C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, the use amounts thereof can be appropriately adjusted to improve the lifetime.

In the electrolyte of the lithium metal secondary battery, the lithium salt is dissolved in the organic solvent to act as a lithium ion supply source in the battery, thereby enabling a basic operation of a lithium secondary battery of another embodiment, and promoting the movement of lithium ions between a positive electrode and a negative electrode.

As the lithium salt, a lithium salt widely applied to an electrolyte may be generally used. For example, as in Experimental Example described hereinafter, lithium bis(fluorosulfonyl)imide (LiFSI) may be used, but additionally, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are a natural number), LiCl, LiI, $LiB(C_2O_4)_2$ (lithium bis(oxalato)borate; LiBOB) or a combination thereof may be used.

Further, in the electrolyte, the concentration of the lithium salt may be controlled within the range of 0.1 to 5.0M. Within this range, the electrolyte solution can have adequate conductivity and viscosity, so that the lithium ions can be effectively moved within the lithium metal secondary battery. However, this is merely an example, and the invention is not limited thereto.

The electrolyte may be in the form of being impregnated in a porous separator disposed between the negative electrode and the positive electrode. Here, the porous separator can be used without limitation as long as it separates the negative electrode and the positive electrode to provide a passage for moving lithium ions, and thus is normally used in a lithium battery. That is, those having low resistance to ion movement of the electrolyte and having excellent electrolyte-moisturizing capability can be used.

For example, the separator may be selected from glass fiber, polyester, Teflon, polyethylene, polypropylene, polytetrafluoroethylene (PTFE) or a combination thereof, and it may be in the form of non-woven fabric or woven fabric. For example, polyolefin-based polymer separators such as polyethylene and polypropylene are mainly used for lithium ion batteries. A coated separator containing a ceramic component or a polymer material may be used to secure heat resistance or mechanical strength. Optionally, it may be used in a single-layer or multi-layer structure.

Meanwhile, when the electrolyte of the lithium secondary battery is a solid electrolyte, the solid electrolyte that can be used is not particularly limited.

Further, regardless of the electrolyte of the lithium metal secondary battery, the positive electrode may include a positive electrode current collector, and a positive electrode mixture layer disposed on the positive electrode current collector.

In this case, the positive electrode mixture layer can be manufactured by mixing a positive electrode active material and a binder, and optionally, a conductive material or a filler, etc. in a solvent to produce a positive electrode mixture in the form of slurry, and then coating the positive electrode mixture onto the positive electrode current collector. Since the above-mentioned positive electrode-manufacturing method is widely known in the art, a detailed description thereof will be omitted herein.

In the case of the positive electrode active material, it is not particularly limited as long as it is a material capable of reversibly intercalating and de-intercalating lithium ions. For example, it may include one or more of complex oxides of cobalt, manganese, nickel, iron, or a combination of metals; and lithium.

In a more specific example, a compound represented by any of the following chemical formulas can be used as the positive electrode active material. $Li_aA_{1-b}R_bD_2$ (where, $0.90 \leq a \leq 1.8$ and $0 \leq b \leq 0.5$); $LiaE_{1-b}R_bO_{2-c}D_c$ (where, $0.90 \leq a \leq 1.8$, $0 \leq b \leq 0.5$, and $0 \leq c \leq 0.05$); $LiE_{2-b}R_bO_{4-c}D_c$ (where, $0 \leq b \leq 0.5$, $0 \leq c \leq 0.05$); $Li_aNi_{1-b-c}Co_bR_cD_\alpha$ (where, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (where, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (where, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (where, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (where, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (where, $0.90 \leq a \leq 1.8$, $0 \leq b \leq 0.5$, $0 \leq c \leq 0.05$ and $0 < \alpha < 2$); $Li_aNi_bE_cG_dO_2$ (where, $0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ (where, $0.90 \leq a \leq 1.8$, $0 \leq b \leq 0.9$, $0 \leq c \leq 0.5$, $0 \leq d \leq 0.5$ and $0 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, one having a coating layer on the surface of the above-mentioned compound can also be used, or a mixture of the compound with a compound having a coating layer can be used. The coating layer may include a coating element compound, such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that may be widely understood by those skilled in the art, detailed descriptions thereof will be omitted.

The positive electrode current collector is typically produced to have a thickness of 3 to 500 The positive electrode current collector is not particularly limited as long as it has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is not particularly limited as long as it is an electronically conductive material without causing a chemical change in the battery. As examples thereof, graphite such as natural graphite or artificial graphite; carbon blacks such as carbon black, acetylene black, ketjen black, channel black, furnace black, lamp black, and thermal black; conductive fibers such as carbon fiber and metal fiber; carbon fluoride powder; metal powders such as aluminum powder, and nickel powder; conductive whiskers such as zinc oxide and potassium titanate; conductive metal oxides such as titanium oxide; conductive materials such as polyphenylene derivatives may be used.

The lithium metal secondary battery of one embodiment may not only be used in a unit cell used as a power source for a small device, but also it can be used as a unit cell in a medium- or large-sized battery module including a plurality of battery cells. Furthermore, a battery pack including the battery module may be configured.

Hereinafter, preferred examples of the present disclosure, comparative examples, and test examples for evaluating them are described. However, the following examples are only preferred examples of the present disclosure, and the present disclosure is not limited to the following examples.

Example 1: Manufacture of a Negative Electrode in which a Diazonium Ion Containing Negative Electrode Protective Layer is Formed 10 mmol of 4-nitroaniline and 10 mmol of tert-butyl nitrite were dissolved in 50 mL of acetonitrile, and then lithium metal was immersed for 2 hours under the condition of 25° C. Then, it was washed with acetonitrile and vacuum-dried for 12 hours to manufacture a negative electrode in which a negative electrode protective layer was formed.

Experimental Example 1: Surface Analysis of Each Negative Electrode (Confirmation of Formation of Protective Layer)

The surface of the negative electrode formed in the Example was analysed by TEM and EELS (electron energy loss spectroscopy) mapping. The results of such surface analysis were shown in the FIGURE. Referring to the right FIGURE of the FIGURE (EELS analysis result), it was confirmed that the nitrogen component derived from diazonium ions was well distributed on the surface of the negative electrode. From this, it was confirmed that the negative electrode protective layer was uniformly and favorably formed on the surface of the negative electrode. In addition, it was confirmed that the nitrogen component in the negative electrode protective layer was included in an amount of 6.16 wt. %.

Example 2: Manufacture of Lithium Metal Secondary Battery Including the Negative Electrode of Example $LiNi_{0.5}Mn_{1.5}O_4$ as a positive electrode active material, Super-P as a conductive material, and polyvinylidene fluoride (PVDF) as a binder were used, respectively, and the positive electrode active material:the conductive material: the binder were mixed in a weight ratio of 94:3:3 to form a mixture. NMP as a solvent was added to the mixture to prepare a positive electrode active material slurry. The positive electrode active material slurry was coated onto one surface of an aluminium foil (thickness: 10 μm), and dried at 120° C. for 30 minutes. The produced positive electrode was punched with a diameter of 11 mm, and then dried under vacuum at 120° C. for 12 hours to manufacture a positive electrode.

A 2032 type coin cell was manufactured using each negative electrode sample of Example 1 and the positive electrode in a glove box under an argon atmosphere. At this time, a PP/PE/PP multilayer separator was used as the separator, and 1.3M $LiPF_6$ dissolved in a mixed solvent (30:20:50 in vol %) of DMC, EMC, and DEC was used as an electrolyte solution, 100 μL was injected into the coin cell. Thereby, a lithium metal secondary battery of Example 2 was manufactured.

Comparative Example 1: Manufacture of Lithium Metal Secondary Battery

A lithium metal secondary battery of Comparative Example 1 was manufactured in the same manner as in Example 2, except that lithium metal in which the negative electrode protective layer was not formed was used as the negative electrode, instead of the negative electrode of Example 1.

Experimental Example 2: Evaluation of Capacity Retention Rate and Short Circuit of Secondary Batten (Confirmation of Dendrite Growth Suppression Characteristics)

Using the cells manufactured in Example 2 and Comparative Example 1, first, charging and discharging were performed three times at a current density of 12 mA·g$^{-1}$. Then, a constant current charge/discharge test was performed in the range of 3.5V to 4.9V. At this time, a charge/discharge test was performed at a current density of 120 mA·g$^{-1}$ at 60° C., and the cycle in which the capacity-to-capacity retention ratio became 80% during initial charge/discharge was evaluated and shown in Table 1 below.

On the other hand, using the cells manufactured in Example 2 and Comparative Example 1, the time point of occurrence of a cell short circuit was evaluated by the following method. That is, charging was performed up to 4.9V with a current density of 12 mA·g$^{-1}$, and a constant voltage of 4.9V was continuously applied to confirm the time when a cell short circuit occurred. The time elapsed until the cell short circuit occurred is shown in Table 1 below.

For reference, during the charge process of the lithium metal secondary battery, lithium electrodeposition reaction occurs on the negative electrode surface, and as a result, acicular dendrite grows. When such acicular dendrites continue to grow due to continued charging, they may break through the separator and cause a short circuit of the cell. Therefore, the time elapsed until the cell short circuit occurred may reflect the growth of acicular dendrites and the degree of suppression thereof on the negative electrode surface.

TABLE 1

| | Capacity retention rate (80%) | Occurrence time of cell short circuit (hr.) |
|---|---|---|
| Comparative Example 1 | 52 cycle | 21 hours |
| Example 2 | 76 cycle | 34 hours |

Referring to Table 1, it was confirmed that in Example 2, the growth of acicular dendrites was effectively suppressed by the formation of the negative electrode protective layer, and the time elapsed until the cell short occurred was much longer than that of Comparative Example 1, Further, it was confirmed that by suppressing the growth of acicular dendrites, the battery of Example 2 exhibited a capacity retention rate of 80% in a very long cycle as compared with Comparative Example 1 and could have excellent life characteristics.

The invention claimed is:

1. A lithium metal secondary battery, comprising:
a negative electrode comprising:
a negative electrode current collector;
a lithium metal film present on at least one surface of the negative electrode current collector;
a negative electrode protective layer comprising a diazonium ion chemically bonded to the lithium metal film;
a positive electrode comprising one or more complex oxides of cobalt, manganese, nickel, or iron; and lithium; and
an electrolyte disposed between the negative electrode and the positive electrode,
wherein the negative electrode protective layer has a thickness of 5 nm to 500 nm, and the electrolyte comprises a lithium salt and a non-aqueous organic solvent comprising a carbonate-based solvent, and
wherein the negative electrode protective layer comprises the diazonium ion having Chemical Formula 1, or comprises a salt of the diazonium ion and the group A present in the diazonium ion is graft bonded to the surface of the lithium metal film:

   Chemical Formula 1 in Chemical Formula 1, A is an aryl group having 6 to 40 carbon atoms substituted with nitro group.

2. The lithium metal secondary battery according to claim 1, wherein the negative electrode current collector comprises copper.

3. The lithium metal secondary battery according to claim 1, wherein
the electrolyte comprises at least one lithium salt selected from lithium bis(fluorosulfonyl)imide (LiFSI), $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are a natural number), LiCl, LiI, or $LiB(C_2O_4)_2$ (lithium bis(oxalato)borate; LiBOB).

4. The lithium metal secondary battery according to claim 1, wherein the lithium metal film has a thickness of 1 μm to 100 μm.

5. The lithium metal secondary battery according to claim 1, wherein the negative electrode protective layer is formed in a single reaction step by reacting an amine compound and a nitrite compound in a solvent on the lithium metal thin film while the diazonium ion is chemically bonded to the lithium metal film.

6. The lithium metal secondary battery according to claim 1, wherein a time point at which a capacity-to-capacity retention ratio of the lithium metal secondary battery is 80% during an initial charge/discharge is 76 cycles or more, the time point being determined according to a charge/discharge test performed in a range of 3.5V to 4.9V and at a current density of 120 $mA \cdot g^{-1}$ at 60° C. after first charging and discharging the battery three times at a current density of 12 $mA \cdot g^{-1}$.

7. The lithium metal secondary battery according to claim 1, wherein a time point of occurrence of a cell short circuit of the lithium metal secondary battery is 34 cycles or more, the time point being determined by performing charging up to 4.9V with a current density of 12 $mA \cdot g^{-1}$, and then charging continuously at a constant voltage of 4.9V to determine a time when a cell short circuit occurs.

\* \* \* \* \*